Patented Dec. 16, 1952

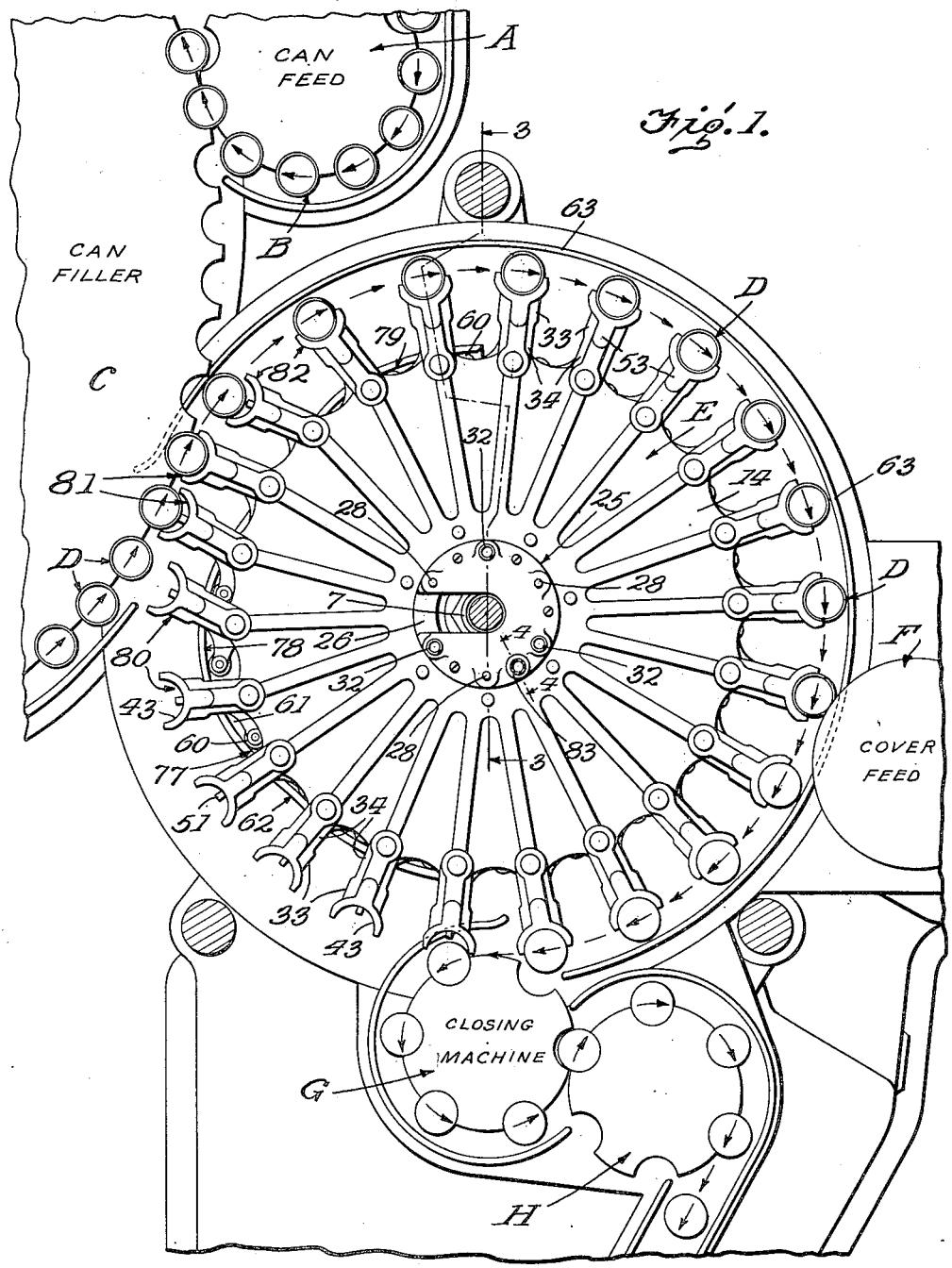

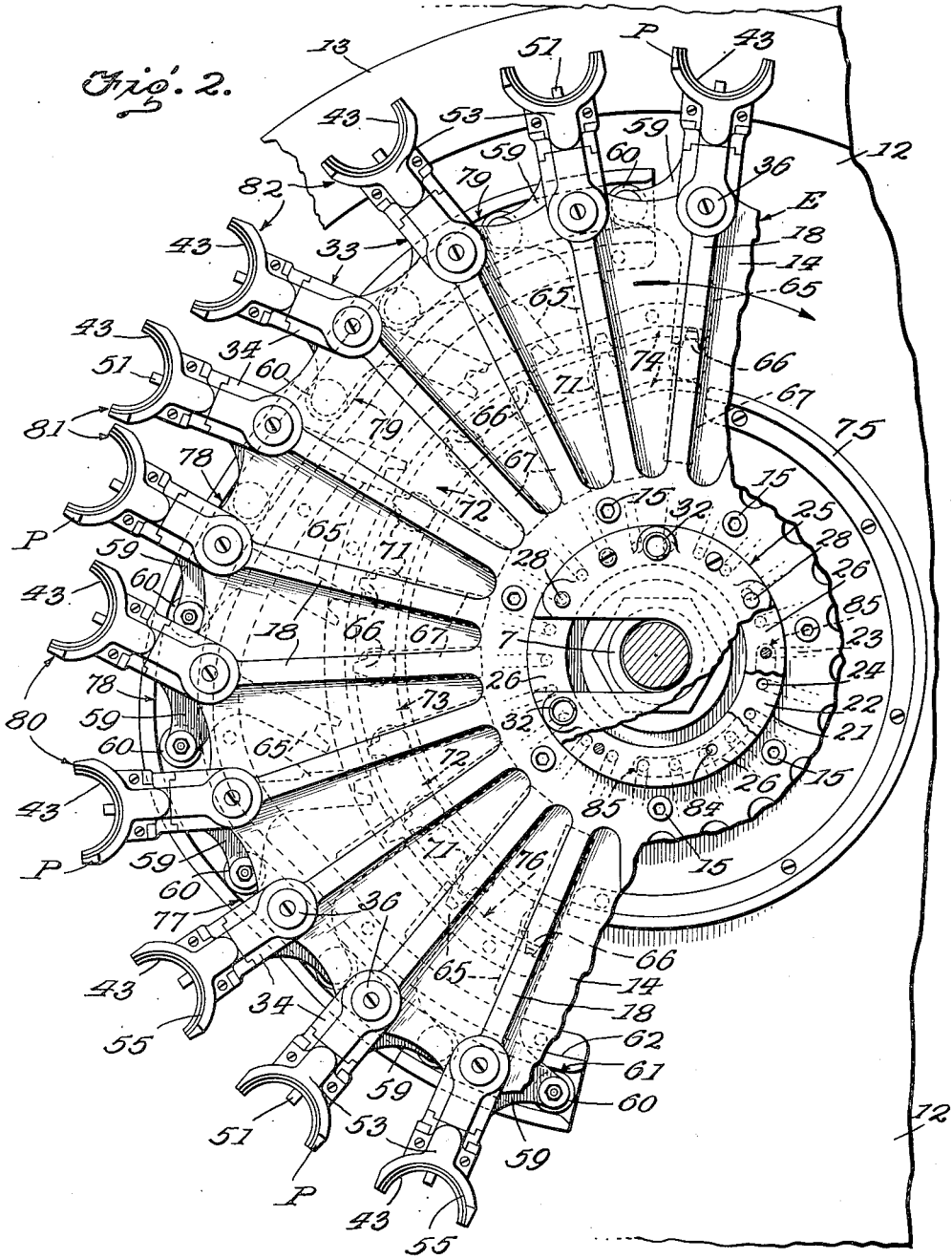

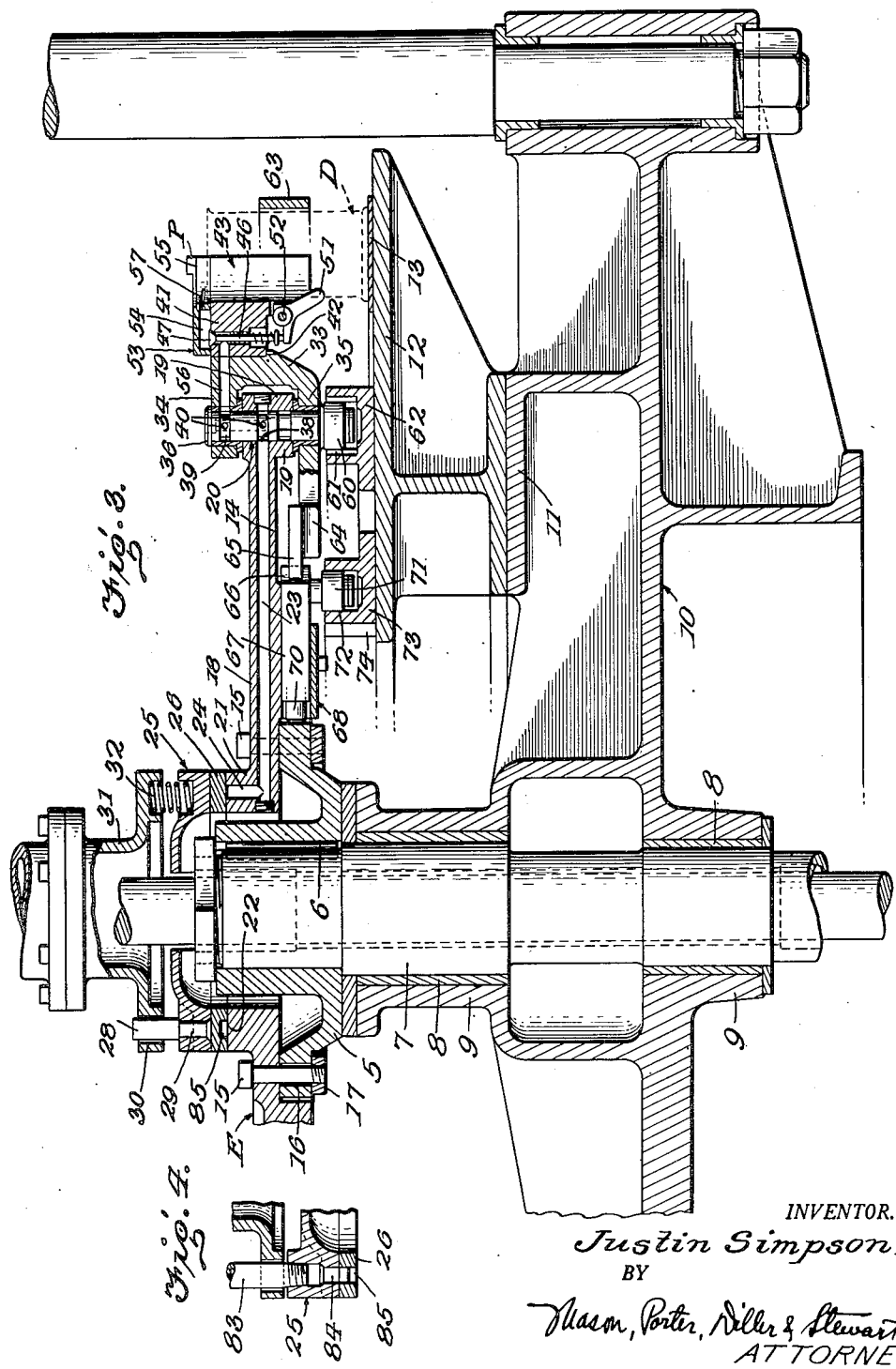

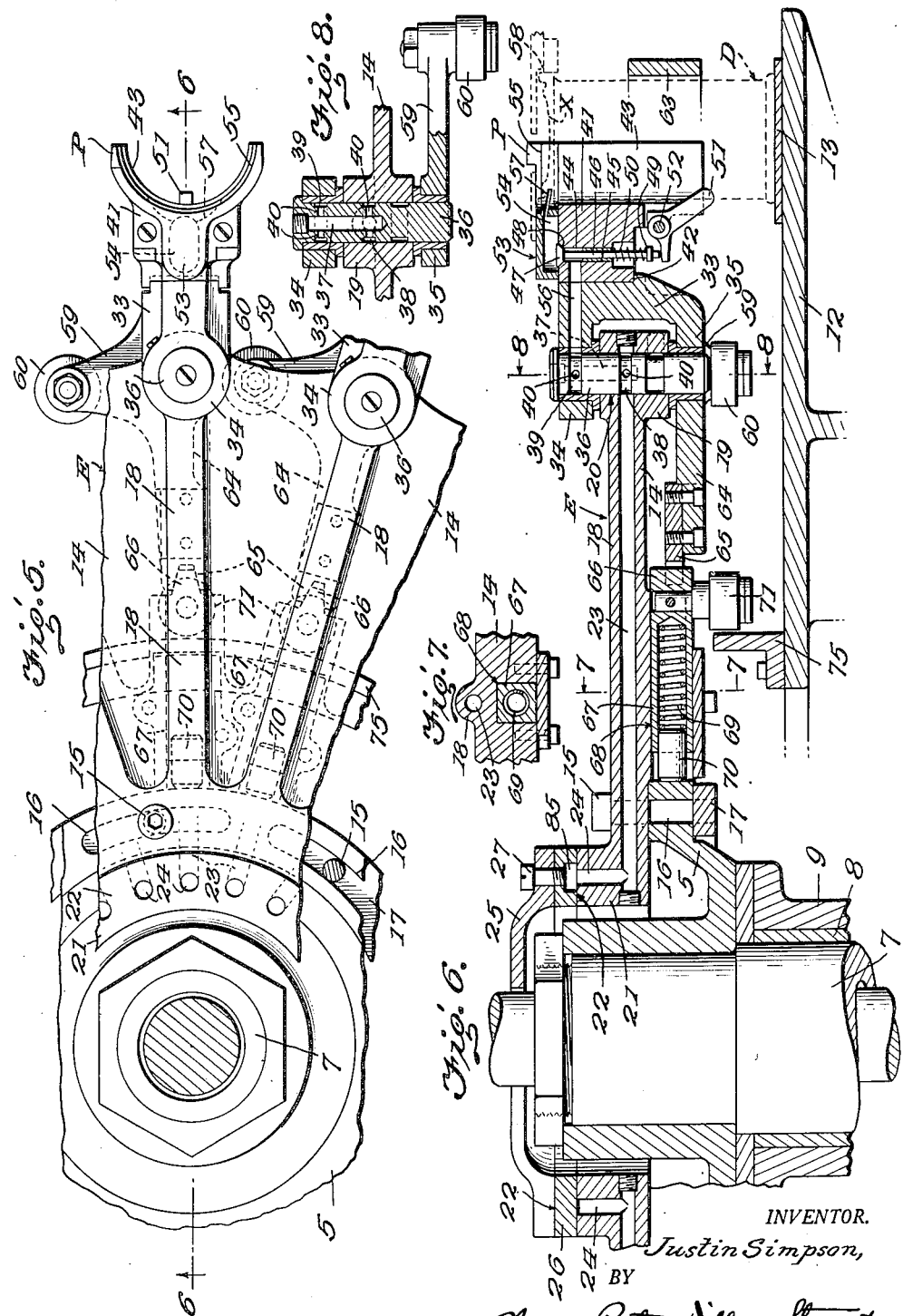

2,621,841

UNITED STATES PATENT OFFICE 2,621,841

FILLED CAN HANDLING APPARATUS

Justin Simpson, Elmhurst, Ill., assignor to Continental Can Company, Inc., New York, N. Y., a corporation of New York Application July 1, 1948, Serial No. 36,391

16 Claims. (Cl. 226—75)

The invention relates generally to can handling apparatus, and more particularly to apparatus for handling cans after they have been filled and while they are being transferred from a filling machine to a closing machine, and it primarily seeks to provide a novel transfer turret structure capable of receiving the filled cans from a rotating turret of a filling machine and transferring them to a rotating turret of a closing machine, rapidly and without spill, and in a manner for accelerating the speed of movement of the cans and increasing the spacing thereof en route.

Present day closing machines are capable of closing filled cans by a double seaming operation at the rate of 360 cans per minute. Machines of the type mentioned include a rotary turret, vertically reciprocable pads on the turret for receiving the cans and whereon the cans are rotated while the turret is turning, rotary chucks against which the cans are lifted by the pads and which serve to rotate the cans, and a first and second operation seaming roll set associated with each chuck and effective to perform the double seaming operation by which each can is closed on the rotating turret. A so called four spindle or four chuck machine of this type is shown in the U. S. Letters Patent 1,752,912 issued to A. L. Kronquest on April 1, 1930, and the high speed closing machine herein referred to is a six spindle adaptation of the disclosed Kronquest machine. It has been customary heretofore to feed filled cans and covers to the closing machine turret on a small diameter transfer turret, the filled cans usually being fed to the transfer turret on a straight line conveyor. It has been found that in attempting to operate such can handling apparatus at the high speed referred to, objectionable spillage of the can fill resulted due to the small diameter of the transfer turret and the relatively abrupt direction changes incidental to the feeding and transferring of the filled cans. Moreover, in the conventional filling machines customarily employed in the combination arrangement referred to the cans have their centers spaced apart 3.338" whereas their centers must be spaced apart 5.5" on the high speed closing machine turret, and the filled can transfer means referred to included no provision for satisfactorily accelerating the speed of movement and increasing the spacing of the cans in moving them from the filling machine to the closing machine. Therefore, it is an object of the present invention to provide a novel structure and arrangement of apparatus capable of transferring the filled cans from the filling machine to the closing machine at the high speed required in order to take advantage of the potentialities of the improved, high speed machines, without any abrupt direction changes which might result in objectionable spillage, and with the necessary acceleration in speed of movement of the cans and increase in the spacing thereof while moving toward the closing machine.

An object of the invention is to provide in apparatus of the character stated a novel transfer turret structure including a large number of swingably mounted arms thereon extended in a generally radial direction and having can receiving half molds or pockets at their ends disposed in a large diameter circle and adapted to receive cans directly from the half molds or pockets of the filling machine turret and transfer them directly to the half molds or pockets of the closing machine turret, means being provided for changing the positions of said arms as the transfer turret is rotating in a manner for gradually accelerating the speed of movement of the cans as they are picked up at the filling machine and increasing the spacing thereof so that they will be properly receivable in the half molds or pockets of the closing machine turret.

Another object of the invention is to provide a transfer turret structure of the character stated in which each swingably mounted arm includes a crank extension equipped with a roller engaged with a stationary cam during rotation of the turret to bring about the desired changes in position of the arms, means also being provided for locking the arms in position after the correct spacing of the filled cans has been attained, and for unlocking said arms after the cans have been transferred to the closing machine turret and before they approach the position at which they pick up filled cans from the filling machine turret.

Another object of the invention is to provide a transfer turret structure of the character stated in which the arm locking means includes a lock notch provided in each swingably mounted arm, a locking detent movably mounted on the turret in position for engaging in each lock notch, spring means constantly tending to project each detent into the associated lock notch, and cam operated means for retracting the detents from the lock notches.

Another object of the invention is to provide in a transfer turret structure of the character stated novel means for directing an air displacing and excluding gaseous medium into the head spaces of the filled cans as they are being transferred thereon, said means including a delivery duct extending in proper position through each arm and its pivotal mounting on the turret and terminating in a communication leg toward the center of the turret, a stationary valve member contacting the turret and having an arcuate slot with which the communicating legs of the ducts serially communicate, and means for directing the gaseous medium into said slot.

Another object of the invention is to provide gaseous medium delivery means of the character stated in which each duct includes an outlet disposed to direct the gaseous medium into the respective arm pocket or half mold and the open top of a filled can therein, and in which there is associated with each duct a spring seated valve means normally closed to prevent passage of gaseous medium out of the duct, and means actuated by contact of a can seated in the respective arm pocket or half mold to hold the valve means open.

With the above and other objects in view that will hereinafter appear, the nature of the invention will be more clearly understood by reference to the following detailed description, the appended claims, and the several views illustrated in the accompanying drawings.

In the drawings:

Figure 1 is a somewhat diagrammatic plan view illustrating the invention in cooperative relation with can feed means, can filling means, cover feed means and can closing means.

Figure 2 is an enlarged fragmentary plan view illustrating that portion of the transfer turret on which the acceleration or increased spacing of the filled cans is brought about.

Figure 3 is an enlarged fragmentary vertical cross section taken through the transfer turret on the line 3—3 on Figure 1.

Figure 4 is an enlarged fragmentary vertical cross section taken on the line 4—4 on Figure 1.

Figure 5 is an enlarged fragmentary plan view illustrating one of the transfer turret arms in its radially aligned and locked position.

Figure 6 is a vertical cross section taken on the line 6—6 on Figure 5.

Figure 7 is a fragmentary vertical cross section taken on the line 7—7 on Figure 6.

Figure 8 is a fragmentary vertical cross section taken on the line 8—8 on Figure 6.

In the example of embodiment of the invention herein shown, a can feeding means is diagrammatically indicated at A, and this serves to place empty cans B in the pockets of the can filler machine indicated at C. The filled cans indicated at D are taken away from the pockets of the filling machine by the large transfer turret structure generally designated E and are accelerated and increased in spacing thereby and fed past the cover feed means diagrammatically indicated at F to the closing machine diagrammatically indicated at G. The filled and closed cans are discharged from the closing machine by discharge means diagrammatically indicated at H.

The large transfer turret structure and its cooperative relation with the machine structures previously described and diagammatically illustrated in Figure 1 are novel, and said transfer turret structure serves not only to take the filled cans away from the filling machine and accelerate the speed of movement and increase the spacing thereof and deliver them to the closing machine without spillage, but it also provides ample space for the mounting of jetting devices for causing foam producing beverages such as beer to foam and crowd air out of the can head spaces, slack fill detecting and ejecting means and no-can, no-cover control devices between the point at which the filled cans are received by the transfer turret and the point at which covers are deposited on the cans while being moved by said turret, should the inclusion of such devices be desired.

The transfer turret means generally designated E includes a rotor body 5 which is keyed as at 6 to a sleeve 7 to which rotation is imparted in any approved manner (not shown). The sleeve 7 rotates in bearings 8 in the center hub portion 9 of a stationarily supported frame structure 10 in the manner clearly illustrated in Figures 3 and 6 of the drawings.

The frame structure 10 includes an annular table portion 11 whereon is supported an annular supporting ring 12. A wear ring 13 is mounted on the supporting ring 12 and the filled cans D are moved over this wear ring by the rotating turrent structure in a manner to be described in greater detail hereinafter.

A turret plate 14 is secured to the rotor body 5 by cap screws 15 which pass through elongated slots 16 in said rotor body and into threaded bores in a clamp ring 17 disposed beneath said body. See Figures 3, 5 and 6. In this manner, the turret plate is removably and adjustably secured on the rotor body 5.

The turret plate 14 is provided with a plurality of equidistantly spaced, radial upstanding ribs or enlargements 18, and each said rib or enlargement terminates at its outer end in an enlarged bearing boss 19 having a vertical bore 20 extending therethrough. The turret plate 14 also has a center hub or boss 21 having a horizontal flat upper face 22, and a radial duct 23 extends through each rib or enlargement 18 into the respective vertical bore 20. Each said duct communicates at its inner end with an upwardly extending duct leg 24 which passes through the upper flat face 22 of the hub or boss 21.

A stationary valve body or ring 25 is provided and has a valve ring 26 secured as at 27 to its undersurface. The ring 25 is secured against rotation by pins 28 fixed thereto as at 29 and engaging in sockets 30 formed in an outwardly extending flange of the fixedly mounted housing member 31. Compression springs 32 interposed between said housing flange and the upper surface of the ring 25 in the manner clearly illustrated in Figures 1 and 3 of the drawings serve to yieldably press the valve ring assembly 25, 26 against the flat upper face 22 of the rotating turret plate 14.

An arm 33 is swingably mounted on each bearing boss 19, being bifurcated to provide an upper arm portion 34 extending over said boss, and a lower arm portion 35 extending under said boss in the manner clearly illustrated in Figures 3, 6 and 8 of the drawings. A pin 36 serves to pivotally connect each arm 33 to the associated boss 19, and each pin is equipped with a center duct 37, a lower annular duct 38, upper annular duct 39, and cross ducts 40 which communicate between said annular ducts and said center duct.

A half mold or pocket member 41 is secured to the outer end of each arm 33, the same resting on a supporting step 42. Each said pocket member 41 is equipped with a half mold or pocket portion 43 at its outer extremity and has an upright bore 44 having a bearing 45 therein in which a valve stem 46 is vertically reciprocable. Each stem carries a poppet valve 47 at its upper end in position for engaging with a seat 48 in the upper end of the respective bore 44, and an abutment 49 is provided adjacent the lower end of each said stem. A compression spring 50 interposed between each stem abutment 49 and the lower end of the respective bearing 45 constantly tends to hold the valve 47 against its seat. A bell crank lever 51 is pivotally mounted as at 52 on each of the swingable arm carried half mold or pocket members 41 with one of its arms extending into the pocket as shown in Figure 6, and with its other arm extending closely under the lower end of the respective valve stem 46. It will be apparent that whenever a can is located in one of the half molds or pockets, it will displace the respective lever 51 inwardly in a manner for forcing the respective valve stem 46 upwardly and displacing or unseating the poppet valve 47 carried at its upper end extremity. It naturally follows that when no can is present in a given half mold or pocket the valve 47 associated therewith will remain closed, being so held by the respective closing spring 50.

A gaseous medium directing member 53 is secured atop each pocket member 41, and each said member is chambered as at 54 over the respective control valve 47 and is equipped with a shelf 55 on which a can cover can rest in the manner clearly illustrated in Figure 6. A duct 56 connects between each upper annular pivot pin duct 39 and the valve bore 44 directly beneath the cooperating valve 47, and a fan-shaped, downwardly inclined delivery slot 57 opens through the inner wall of each gaseous medium directing member 53 into the respective pocket in position for directing a gaseous medium into the open top portion of a filled can D and beneath the overlying complementary cover X in the manner clearly illustrated in Figure 6.

It is to be understood that the means herein described for directing a gaseous medium into the head spaces of the filled cans for the purpose of driving air out of said head spaces may be employed as the sole means for this purpose, or it may be used as an auxiliary to foam producing jetting devices utilized for the main purpose of crowding out said air, in which case the herein illustrated gaseous medium introducing devices act solely to direct the gas at low pressure so as not to have aspirator effect and into position for placing a layer of gas over the foam and by this means keep the head space free from air when the foam is slow in forming or when bubbles of gas burst during movement of the filled and jetted cans to the sealing station. The arc of the transfer turret over which the introduction of the gaseous medium will occur will, of course, vary in accordance with the particular nature of the gaseous medium introduction, commencing at any time after the engagement of the filled cans in the pockets of the transfer turret and terminating at or just after the transfer of said cans to the closing machine turret pockets. Whatever the extent of this gaseous medium introduction, the covers X after they are fed into position over the filled cans D as illustrated in Figure 6 will be moved along by the respective ledges or shelves 55 and the upstanding pushers P over supporting and guiding devices diagrammatically indicated at 58.

A crank extension 59 is provided on each pivotally mounted arm 33, or rather the lower arm portion 35 thereof as indicated in Figures 2, 5 and 8, and a roller 60 depends from each said crank extension. The rollers 60 are engageable in the groove 61 of an arm position controlling cam 62 which is mounted on the annular supporting ring 12 in the manner clearly illustrated in Figures 2 and 3 of the drawings. It will be noted also by reference to Figures 1 and 6 of the drawings that an outer can confining guide 63 is provided for holding the filled cans in the turret arm pockets 43 as they are received from the can filling machine C and until they are delivered into the pockets of the closing machine G.

The lower arm 35 of each swingably mounted turret arm 33 is inwardly extended as at 64 and has a detent receiving notch member 65 secured thereon in position for being engaged by a detent 66 projecting from a slide 67 which is guided in a bearing 68 depending from the turret plate 14. Each slide member 67 is bored to receive a compression spring 69 which engages between the inner end of the bore and an abutment plunger 70 inserted in the end of said bore in position for being engaged by said spring and for in turn engaging the peripheral surface of the flange of the rotor member 5 to which the turret plate 14 is secured. It will be apparent that the springs 69 constantly tend to project the detents 66 outwardly for engagement with the respective notch members 65. Each slide 67 is equipped with a depending roller 71 which is engageable in the groove 72 in a cam 73 mounted on the supporting ring 12 in the manner clearly illustrated in Figures 2 and 3. It will be apparent by reference to Figure 2 that the main body of the cam groove 72 serves to hold the detents 66 retracted away from the notch member 65 against the action of the springs 69. This cam groove includes a release portion 74 which clears the rollers 71 in a manner for allowing them to move outwardly as shown at the top in Figure 2 for engaging the detents 66 with the notch members 65 of the swingably mounted arms which are then extended to the radial position. Beyond the relief portion 74 of the groove a detent securing rail 75 is secured upon the supporting ring 12 in position for locking the detents in the arm securing position just described. The securing rail 75 extends around to the receiving end of the cam 73 as shown at the bottom in Figure 2, and at this point the groove of said cam is provided with a detent retracting portion 76 which is effective to retract the detents 66 away from the notch members 65 against the action of the springs 69, thereby to release the swingably mounted pocket arms so that they may be swung by cam action out of the radial position in the manner clearly illustrated in Figures 1 and 2.

It will be apparent by reference to Figure 2 that the turret arm position controlling cam groove 61 has a concentric receiving end portion, followed by an arm advancing portion 77, followed by an arm retracting portion 78 which is in turn followed by a gradual, arm advancing portion 79 merging into a concentric groove portion adjacent the delivery end of the cam.

Attention is directed to Figures 1 and 2 of the drawings from which it will be apparent that the control cam arranging hereinabove described functions after the releasing of the locking detents 66 to first advance the arms rather abruptly forwardly of the radial position, in the manner indicated at the two positions 80 in Figures 1 and 2, and then retard them or move them back toward and past the radial position in the manner indicated at the two positions 81 to intercept and pick up the filled cans at the discharge portion of the filling machine C. This brings the arms close together so that they will properly contact the relatively closely spaced cans on the turret of the filling machine. From this point on the cam groove shaping is such that the arms are gradually accelerated to speed up the filled can travel and increase the spacing of the cans as they are moved away, as indicated at the two positions 82, until they finally reach the spaced condition in which they are to be deposited in the closing machine turret pockets, or in other words until the arms reach and are locked in the radial position. Stated another way, it will be noted that eleven of the swingably mounted arms are shown in Figure 2, all of the remaining arms of the turret structure, not shown in this figure, being locked in the radial position. Considering the eleven arms shown in Figure 2 as travelling in a clockwise direction, the first three of said arms are in the radial position, the first being locked by the detent 66 and the other two being released by retraction of said detents. The next or fourth arm is being abruptly advanced ahead of the radial position, and the following or fifth arm has just reached the peak of this advancing movement. The next or sixth arm is in the process of being retarded or moved back toward the radial position, and the following or seventh arm similarly is being retarded and has been moved back beyond the radial position. The next or eighth arm has reached the limit of its retarding movement and is starting or about to start its gradual advancing movement, and the following or ninth arm is in the process of being advanced toward the radial position. The last two or the tenth and eleventh arms are in the radial position, the first thereof still being free, and the second thereof or eleventh arm being locked in its radial position by the freeing and outward projection of the detent 66. Thus the arms are advanced while approaching the point at which the cans are picked up by the transfer turret from the turret of the filling machine, are retarded while passing said point and picking up the filled cans, and are advanced or accelerated gradually while moving away from said point so as to accelerate the speed of movement of the cans and properly space the same in the manner previously described.

A duct 83 through which an inert gas or some other suitable gaseous medium may be delivered from a source (not shown) is connected as at 84 with the arcuate slot 85 provided in the underface of the valve ring 26. See Figures 2 and 4. In Figure 2 the arcuate slot or clearance 85 is shown approximately 90° in length so as to extend from a point just in advance of the cover feed means F to the point at which the filled cans are delivered into the pockets of the turret of the closing machine G. As previously stated, however, this arcuate slot may be extended a greater or lesser distance according to the particular installation and the purpose of introducing the gaseous medium.

As each duct leg or portion 24 comes into registry with the arcuate gaseous medium supply duct or slot 85 the gaseous medium will be delivered through the radial duct 23, the annular duct 38, the cross ducts 40 and center pin duct 37, the annular duct 39, the arm duct 56, the bore 44 past the open valve 47, assuming a filled can D to be in the respective pocket 43 in position for displacing the valve controlling lever 51, and through the chamber 54 and fan-shaped slot 57 into the open top of the can for the purpose described. This delivery of gaseous medium will continue so long as the duct and passage equipments remain in communication with the arcuate slot 85 as aforesaid.

While one form of the invention has been shown for purposes of illustration, it is to be clearly understood that various changes in the details of construction and arrangement of parts may be made without departing from the spirit and scope of the invention as defined in the appended claims.

I claim:

1. In apparatus of the character described, the combination of the rotary turret of a machine for filling cans whereon the cans are arranged in equidistant and closely spaced relation, the rotary turret of a closing machine whereon the cans are to be closed after being received in equidistant and widely spaced relation, and a transfer turret structure having pocketed transfer arms thereon with the arm pockets arranged in a large diameter circle to receive cans from the filling machine turret and accurately confine and transfer said cans to the closing machine turret, said arms having pivot mountings on said turret structure with the pivots arranged in a circle much larger in diameter than the diameter of the closing machine turret, and said filling machine and transfer turrets having the peripheral limits of their respective pockets arranged in close but non-overlapping path relation, and means for shifting said arms relative to the turret structure movement and on their pivot mountings after they receive the cans from the filling machine turret and while maintaining substantially said large diameter circular arrangement of the arm pockets to gradually increase the spacing of the cans prior to transfer thereof to the closing machine turret.

2. In apparatus of the character described, the combination of the rotary turret of a machine for filling cans whereon the cans are arranged in equidistant and closely spaced relation, the rotary turret of a closing machine whereon the cans are to be closed after being received in equidistant and widely spaced relation, and a transfer turret structure having pocketed transfer arms thereon with the arm pockets arranged in a large diameter circle to receive cans from the filling machine turret and accurately confine and transfer said cans to the closing machine turret, said arms having pivot mountings on said turret structure with the pivots arranged in a circle much larger in diameter than the diameter of the closing machine turret, and said filling machine and transfer turrets having the peripheral limits of their respective pockets arranged in close but non-overlapping path relation, and means for shifting said arms relative to the turret structure movement and on their pivot mountings to bring them together in position for receiving cans in closely spaced relation from the filling machine turret and then to gradually accelerate their movement relative to the turret structure movement to gradually increase the spacing of the cans prior to transfer thereof to the closing machine turret, said bringing together and also said acceleration of the arms being accomplished while maintaining substantially said large diameter circular arrangement of the arm pockets.

3. In apparatus of the character described, the combination of the rotary turret of a machine for filling cans whereon the cans are arranged in equidistant and closely spaced relation, the rotary turret of a closing machine whereon the cans are to be closed after being received in equidistant and widely spaced relation, and a transfer turret structure having pocketed transfer arms thereon with the arm pockets arranged in a large diameter circle to receive cans from the filling machine turret and accurately confine and transfer said cans to the closing machine turret, means for shifting said arms relative to the turret structure movement to bring them together in position for receiving cans in closely spaced relation from the filling machine turret and then to gradually accelerate their movement relative to the turret structure movement to gradually increase the spacing of the cans prior to transfer thereof to the closing machine turret, said bringing together and also said acceleration of the arms being accomplished while maintaining substantially said large diameter circular arrangement of the arm pockets, and individual locking means associated with each arm including a member carried by the transfer turret structure and shiftable into contact with the respective arm for locking the same in position prior to and during the transferring of cans to the closing machine turret.

4. In apparatus of the character described, the combination of the rotary turret of a machine for filling cans whereon the cans are arranged in equidistant and closely spaced relation, the rotary turret of a closing machine whereon the cans are to be closed after being received in equidistant and widely spaced relation, and a transfer turret structure having pocketed transfer arms thereon with the arm pockets arranged in a large diameter circle to receive cans from the filling machine turret and transfer them to the closing machine turret, and means for shifting said arms relative to the turret structure movement to bring them together in position for receiving cans in closely spaced relation from the filling machine turret and then to gradually accelerate their movement relative to the turret structure movement to gradually increase the spacing of the cans prior to transfer thereof to the closing machine turret, each said arm being pivotally mounted and having a detent receiving notch, and there being included cam retracted and spring projected detents individually engageable in said arm notches for locking the arms in position prior to and during the transferring of cans to the closing machine turret.

5. In apparatus of the character described, the combination of the rotary turret of a machine for filling cans whereon the cans are arranged in equidistant and closely spaced relation, the rotary turret of a closing machine whereon the cans are to be closed after being received in equidistant and widely spaced relation, and a transfer turret structure having pocketed transfer arms thereon with the arm pockets arranged in a large diameter circle to receive cans from the filling machine turret and accurately confine and transfer said cans to the closing machine turret, said arms having pivot mountings on said turret structure with the pivots arranged in a circle much larger in diameter than the diameter of the closing machine turret, and said filling machine and transfer turrets having the peripheral limits of their respective pockets arranged in close but non-overlapping path relation, and means for shifting said arms relative to the turret structure movement and while maintaining substantially said large diameter circular arrangement of the arm pockets and on their pivot mountings to first advance and then retard said arms relative to the speed of rotation of the turret structure to closely space said arms as they are approaching and passing the point at which the turret structure receives the cans from the filling machine turret and then to gradually accelerate the arm shifting movement to gradually increase the spacing of the cans prior to transfer thereof to the closing machine turret.

6. In apparatus of the character described, the combination of the rotary turret of a machine for filling cans whereon the cans are arranged in equidistant and closely spaced relation, the rotary turret of a closing machine whereon the cans are to be closed after being received in equidistant and widely spaced relation, and a transfer turret structure having pocketed transfer arms thereon with the arm pockets arranged in a large diameter circle to receive cans from the filling machine turret and transfer them to the closing machine turret, and means for shifting said arms relative to the turret structure movement to first advance and then retard said arms relative to the speed of rotation of the turret structure to closely space said arms as they are approaching and passing the point at which the turret structure receives the cans from the filling machine turret and then to gradually accelerate the arm shifting movement to gradually increase the spacing of the cans prior to transfer thereof to the closing machine turret, each said arm being pivotally mounted and having a detent receiving notch, and there being included cam retracted and spring projected detents individually engageable in said arm notches for locking the arms in position prior to and during the transferring of cans to the closing machine turret.

7. A transfer turret structure for receiving cans from one conveyor and transferring them to another conveyor and comprising a rotary turret plate, a plurality of transfer arms pivotally mounted on fixed centers said plate and having can receiving pockets outwardly of their pivots in which to accurately confine said cans and arranged in a large circle and crank arms extending laterally of their pivotal mountings and all in the same direction circumferentially of the turret plate, said fixed center arm pivots being arranged in a circle many times larger in diameter than the length of the transfer arms, each said arm extension having an actuator roller extending therefrom, and stationary cam means engaged by said rollers and effective to shift said arms relative to the turret plate as they approach a can receiving position to bring the arm pockets together in position for receiving cans in closely spaced relation and for then shifting said arms relative to the turret plate to gradually accelerate the movement of the pockets relative to said turret plate to gradually increase the spacing of the cans prior to transfer thereof from said pockets said bringing together and also said acceleration of the arms being accomplished while maintaining substantially said large diameter circular arrangement of the arm pockets.

8. A transfer turret structure for receiving cans from one conveyor and transferring them to another conveyor and comprising a rotary turret plate, a plurality of transfer arms pivotally mounted on fixed centers said plate and having can receiving pockets outwardly of their pivots in which to accurately confine said cans and arranged in a large circle and crank arms extending laterally of their pivotal mountings and all in the same direction circumferentially of the turret plate, each said arm extension having an actuator roller extending therefrom, stationary cam means engaged by said rollers and effective to shift said arms relative to the turret plate as they approach a can receiving position to bring the arm pockets together in position for receiving cans in closely spaced relation and for then shifting said arms relative to the turret plate to gradually accelerate the movement of the pockets relative to said turret plate to gradually increase the spacing of the cans prior to transfer thereof from said pockets said bringing together and also said acceleration of the arms being accomplished while maintaining substantially said large diameter circular arrangement of the arm pockets, and individual locking means associated with each arm including a member carried by the transfer turret structure and shiftable into contact with the respective arm for locking the same in said increased spacing prior to and during said transfer of cans.

9. A transfer turret structure for receiving cans from one conveyor and transferring them to another conveyor and comprising a rotary turret plate, a plurality of transfer arms pivotally mounted on said plate and having can receiving pockets outwardly of their pivots and arranged in a large circle and crank arms extending laterally of their pivotal mountings and all in the same direction circumferentially of the turret plate, each said arm extension having an actuator roller extending therefrom, and stationary cam means engaged by said rollers and effective to shift said arms relative to the turret plate as they approach a can receiving position to bring the arm pockets together in position for receiving cans in closely spaced relation and for then shifting said arms relative to the turret plate to gradually accelerate the movement of the pockets relative to said turret plate to gradually increase the spacing of the cans prior to transfer thereof from said pockets, each said arm also having a portion extended inwardly beyond its pivot and equipped with a lock notch, and there being included cam retracted and spring projected detents individually engageable in said notches for locking the arms in said increased spacing prior to and during said transfer of cans.

10. A transfer turret structure for receiving cans from one conveyor and transferring them to another conveyor and comprising a rotary turret plate, a plurality of transfer arms pivotally mounted on said plate and having can receiving pockets outwardly of their pivots, means effective to shift said arms relative to the turret plate as they approach a can receiving position to bring the arm pockets together in position for receiving cans in closely spaced relation and for then shifting said arms relative to the turret plate to gradually accelerate the movement of the pockets relative to said turret plate to gradually increase the spacing of the cans prior to transfer thereof from said pockets, and means including delivery ducts extending through said plate, said arms and their pivotal mountings on said plate for directing a gaseous medium into the open tops of cans being moved about by the pockets of said arms.

11. A transfer turret structure for receiving cans from one conveyor and transferring them to another conveyor and comprising a rotary turret plate, a plurality of transfer arms pivotally mounted on said plate and having can receiving pockets outwardly of their pivots, means effective to shift said arms relative to the turret plate as they approach a can receiving position to bring the arm pockets together in position for receiving cans in closely spaced relation and for then shifting said arms relative to the turret plate to gradually accelerate the movement of the pockets relative to said turret plate to gradually increase the spacing of the cans prior to transfer thereof from said pockets, and means including delivery ducts extending through said plate, said arms and their pivotal mountings on said plate for directing a gaseous medium into the open tops of cans being moved about by the pockets of said arms, and a stationary valve ring having an arcuate slot therein connected with a gaseous medium source and with which said ducts serially communicate.

12. A transfer turret structure for receiving cans from one conveyor and transferring them to another conveyor and comprising a rotary turret plate, a plurality of transfer arms pivotally mounted on said plate and having can receiving pockets outwardly of their pivots, means effective to shift said arms relative to the turret plate as they approach a can receiving position to bring the arm pockets together in position for receiving cans in closely spaced relation and for then shifting said arms relative to the turret plate to gradually accelerate the movement of the pockets relative to said turret plate to gradually increase the spacing of the cans prior to transfer thereof from said pockets, and means including delivery ducts extending through said plate, said arms and their pivotal mountings on said plate for directing a gaseous medium into the open tops of cans being moved about by the pockets of said arms, and a normally closed gaseous medium flow controlling valve in each said duct and having actuator devices contacted by a can in the respective pocket for being opened only when a can is in said pocket.

13. A transfer turret structure for receiving cans from one conveyor and transferring them to another conveyor and comprising a rotary turret plate, a plurality of transfer arms pivotally mounted on said plate and having can receiving pockets outwardly of their pivots, means effective to shift said arms relative to the turret plate as they approach a can receiving position to bring the arm pockets together in position for receiving cans in closely spaced relation and for then shifting said arms relative to the turret plate to gradually accelerate the movement of the pockets relative to said turret plate to gradually increase the spacing of the cans prior to transfer thereof from said pockets, the pivotal mounting of each said arm including an uprightly disposed pivot pin having a center duct therein an upper annular duct a lower annular duct and cross ducts connecting the annular ducts with the center duct, each arm also having a gaseous medium delivery duct opening into the respective pocket and communicating with said upper annular duct, and said plate having an individual gaseous medium receiving duct leading to each of said lower annular ducts, and there being included means for directing a gaseous medium into said plate ducts.

14. A transfer turret structure for receiving cans from one conveyor and transferring them to another conveyor and comprising a rotary turret plate, a plurality of transfer arms pivotally mounted on said plate and having can receiving pockets outwardly of their pivots, means effective to shift said arms relative to the turret plate as they approach a can receiving position to bring the arm pockets together in position for receiving cans in closely spaced relation and for then shifting said arms relative to the turret plate to gradually accelerate the movement of the pockets relative to said turret plate to gradually increase the spacing of the cans prior to transfer thereof from said pockets, each said arm having an arcuate gaseous medium delivery slot extending into its pocket for directing a gaseous medium into the open top of a can in said pocket, a duct leading to said slot, a normally closed valve, and means actuated by contact of a can in each pocket for opening the particular valve, and means for directing a gaseous medium into said ducts and including an arcuate supply slot with which the ducts serially communicate.

15. A transfer turret structure for receiving cans from one conveyor and transferring them to another conveyor and comprising a rotary turret plate, a plurality of transfer arms pivotally mounted on said plate and having can-receiving pockets outwardly of their pivots and arranged in a large circle and crank arms extending laterally of their pivotal mountings and all in the same direction circumferentially of the turret plate, each said arm extension having an actuator roller extending therefrom, and stationary cam means engaged by said rollers and effective to shift said arms relative to the turret plate as they approach a can receiving position to bring the arm pockets together in position for receiving cans in closely spaced relation and for then shifting said arms relative to the turret plate to gradually accelerate the movement of the pockets relative to said turret plate to gradually increase the spacing of the cans prior to transfer thereof from said pockets, each said arm also having a portion extended inwardly beyond its pivot and equipped with a lock notch, and there being included cam retracted and spring projected detents individually engageable in said notches for locking the arms in said increased spacing prior to and during said transfer of cans, and a locking track means effective to secure all of said detents in the arm locking position from the position at which they are spring projected to the locking position until they are cam retracted from said locking position.

16. In apparatus of the character described, the combination of the rotary turret of a machine for filling cans whereon the cans are arranged in equidistant and closely spaced relation, the rotary turret of a closing machine whereon the cans are to be closed after being received in equidistant and widely spaced relation, and a transfer turret structure having pocketed transfer arms thereon with the arm pockets arranged in a large diameter circle to receive cans from the filling machine turret and accurately confine and transfer said cans to the closing machine turret, said arms having pivot mountings on said turret structure with the pivots arranged in a circle much larger in diameter than the diameter of the closing machine turret and being straight and short in length with relation to any given radius extending betwen the turret structure center and one of said pivot mountings, and said filling machine and transfer turrets having the peripheral limits of their respective pockets arranged in close but non-overlapping path relation, and means for shifting said arms relative to the turret structure and on their pivotal mountings to first advance each arm ahead of a true radial position on the turret structure and then retard the same behind said true radial position to closely space the arms as they are approaching and passing the point at which the turret structure removes cans from the filling machine turret and then to gradually accelerate the arm shifting movement until each arm is brought into a true radial position on said transfer structure to properly space the cans for transfer to the closing machine turret.

JUSTIN SIMPSON.

REFERENCES CITED

The following references are of record in the file of this patent:

UNITED STATES PATENTS

| Number | Name | Date |
| --- | --- | --- |
| 1,696,360 | Peyser | Dec. 25, 1928 |
| 2,007,981 | Nordquist | July 16, 1935 |
| 2,026,811 | Bach | Jan. 7, 1936 |
| 2,053,318 | Blackburn | Sept. 8, 1936 |
| 2,155,088 | Hopkins | Apr. 18, 1939 |